Patented Jan. 10, 1933

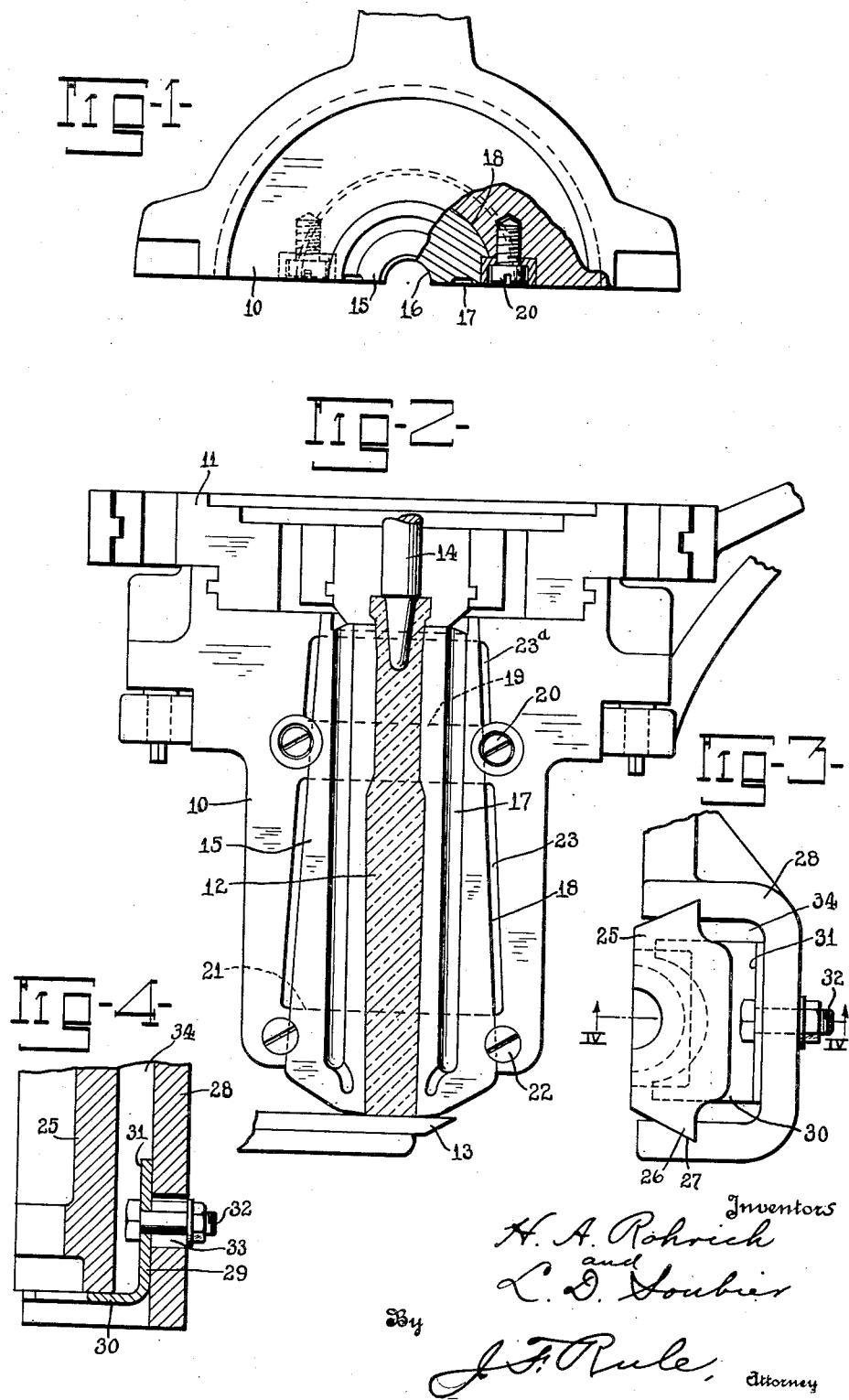

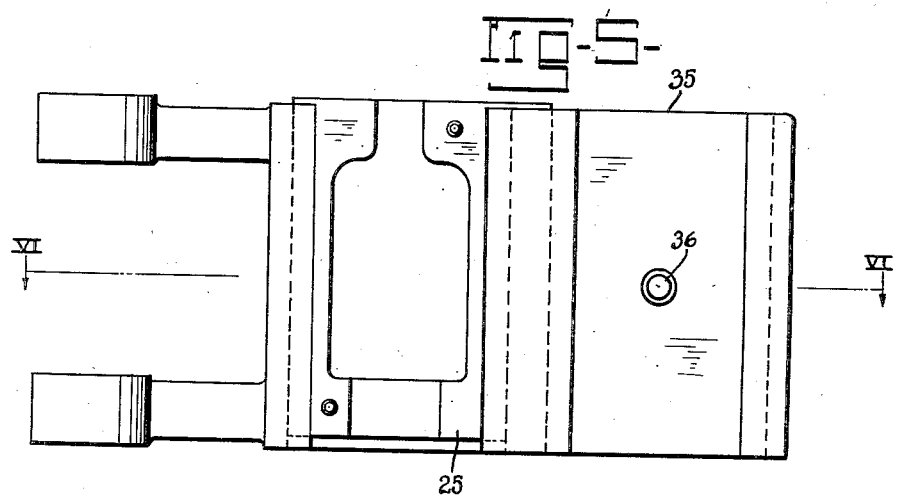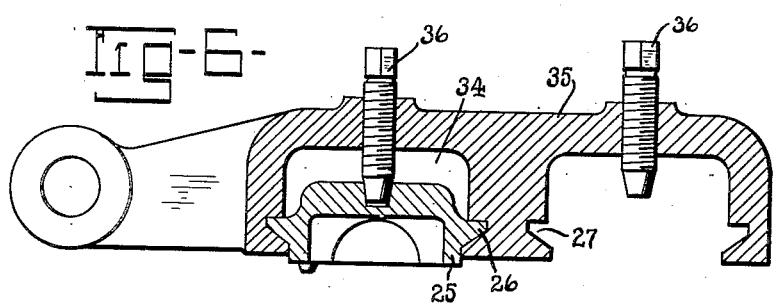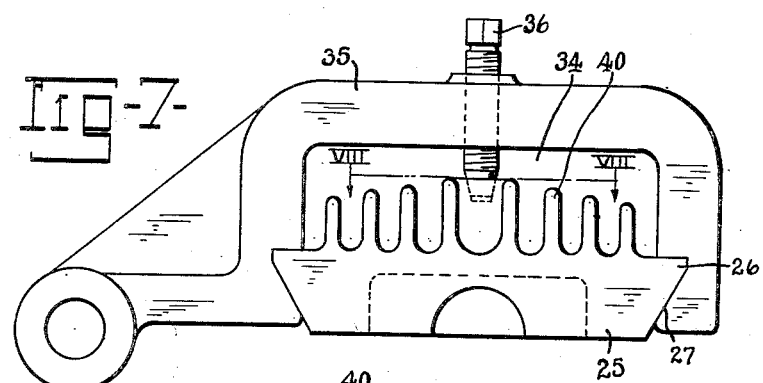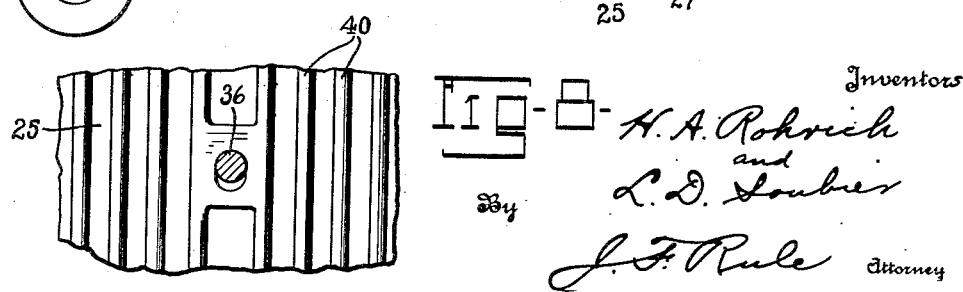

1,894,243

UNITED STATES PATENT OFFICE

HAROLD A. ROHRICH AND LEONARD D. SOUBIER, OF ALTON, ILLINOIS, ASSIGNORS TO OWENS-ILLINOIS GLASS COMPANY, A CORPORATION OF OHIO

MOLD

Application filed January 30, 1931. Serial No. 512,332.

Our invention relates to glass shaping molds, and as herein illustrated is embodied in molds designed for use on machines of the suction type in which mold charges of glass are introduced by suction into the molds.

An object of the invention is to provide an improved mold structure by which excessive chilling of the glass as it enters the mold is prevented, by which the extraction of heat from the parison of glass as it enters the mold is properly distributed and controlled, and by which the temperature of the mold walls in contact with the glass is controlled and graded to provide the most desirable temperatures at all points.

In machines of the suction gathering type the charges of glass are commonly introduced into a blank mold by bringing the lower end thereof into contact with a pool of molten glass and then exhausting the air from the mold cavity so that the glass is drawn upwardly by suction to fill the mold cavity. The neck portion of the article is formed in a neck mold which is positioned at the upper end of the body blank mold and forms a continuation thereof. When the glass enters the mold its temperature is rapidly reduced, the heat being extracted therefrom by the comparatively cold metal walls of the mold. The portion of glass first entering the mold and which forms the neck portion of the parison is subjected to the cooling action of the mold walls during its travel upward through the mold so that there is a tendency for this portion of the glass to be chilled to a much greater extent than that which forms the lower portion of the parison. This inequality of chilling is augmented where the parison is comparatively long and slender so that the glass is sometimes chilled to such an extent that it is too viscous or stiff to properly or readily take the shape of the neck mold. This results in imperfect ware. There is also a tendency for the lower portion of the blank mold to become overheated by the comparatively hot glass in the lower portion thereof and also by contact of the mold with the supply body of molten glass while the charge of glass is being gathered.

An object of the present invention is to overcome the above mentioned difficulties. For this purpose we provide a mold comprising a mold body and a removable liner or bushing, in which the mold cavity is formed. An air space is provided between the bushing and mold body which serves as a heat insulator, preventing excessive or too rapid extraction of heat from the glass as it enters the mold. The lining or bushing, is also preferably tapered so that the walls thereof are thinner at or near the upper end of the mold than at the lower end. This results in comparatively high temperature of the upper portion of the mold walls, preventing excessive chilling of the glass and thus permitting it to readily fill the mold cavity. At the same time the comparatively thick walls of the mold lining adjacent the lower end of the mold prevent excessive heating of the lower portion of the mold walls.

A further object of the invention is to provide an improved construction comprising mold linings or bushings which are readily removable and interchangeable.

Another object of the invention is to provide a mold structure which will not warp or be materially distorted by the high and uneven temperatures to which molds are subjected.

Other objects of the invention will appear hereinafter.

In the accompanying drawings:

Fig. 1 is a part sectional top plan view of a body blank mold section constructed in accordance with the present invention.

Fig. 2 is an elevational view showing the inner face of the blank mold section and a neck mold section in register therewith.

Fig. 3 is a top plan view of a modified form of mold.

Fig. 4 is a detail section at the line IV—IV on Fig. 3.

Fig. 5 is an elevational view of a further modification comprising a double mold.

Fig. 6 is a section at the line VI—VI on Fig. 5.

Fig. 7 is a top plan view of a further modification.

Fig. 8 is a fragmentary view at the plane of the line VIII—VIII on Fig. 7.

Referring particularly to Figs. 1 and 2, the parison mold is, as usual, made in separable sections, each comprising a body blank mold section 10 and a neck mold section 11 above and in register therewith.

The parison of glass 12 is introduced into the mold at the lower end thereof in the usual manner by bringing said end into contact with a supply body or pool of glass and then exhausting the air through the neck mold, causing the glass to run up into and fill the mold cavity, after which the mold is lifted from the supply body and a knife 13 severs the glass. A plunger 14 projects into the neck portion of the parison and forms an initial blow opening through which air under pressure is admitted after the parison is transferred to a finishing mold, for blowing the parison to the form of a finished bottle or other article.

In accordance with the present invention a lining or bushing 15 is removably secured within the mold body 10. The mold cavity 16 is formed within this bushing. The bushing may have formed therein the usual vertical channels 17 from which the air is exhausted during the charging of the mold, thus facilitating the rapid evacuation of air from the mold cavity and complete filling of the mold with glass. The bushing 15 is semi-circular in cross section and is also downcircular and outwardly tapered throughout its length so that its walls are thicker and the diameter greater at the lower end than at the upper end thereof. The body 10 of the mold is recessed to receive the bushing and is formed with a semi-circular bearing surface 19 adjacent its upper end against which bears the rear surface 18 of the bushing, the latter being clamped to the mold body 10 by a pair of holding screws 20. Adjacent the lower end of the mold body 10 is a bearing surface 21 for the bushing. Screws 22 engage the lower portion of the bushing and clamp it against the surface 21.

Surrounding the bushing 15 is an air space extending approximately the length of the bushing and comprising a space or section 23 below the bearing 19 and a section 23a above the bearing 19. This space serves to insulate the greater portion of the outer surface of the bushing from the body 10 and thereby prevents heat from being conducted too rapidly to the body 10. The bushing is therefore brought to a comparatively high temperature which prevents heat from being extracted too rapidly from the glass. As the walls of the bushing are comparatively thin adjacent the upper end thereof, they absorb less heat from the glass, preventing undue chilling of the upper portion of the parison and the temperature of this upper portion of the bushing rises to a comparatively high degree. At the same time the diameter of the lower portion of the bushing being comparatively great, its heat capacity is greater so that excessive heating is prevented and its temperature remains comparatively low. Owing to this relatively low temperature, heat is extracted more rapidly from the lower comparatively hot portion of the parison of glass which has just entered the mold. In this manner a substantially uniform temperature of the parison throughout its entire length may be obtained. The liners or bushings 15 are readily removable for repairs or replacement by other bushings having the same or different design of mold cavity, depending upon the size and shape of the article it is desired to produce.

Figs. 3 and 4 illustrate a modification in which the insert or bushing 25 is of a different design than the bushing 15, shown in Fig. 2. The bushing 25 has lateral extensions 26 which fit in correspondingly shaped vertical recesses 27 formed in the mold body 28. The bushing 25 is slidable vertically in the body 28 permitting said parts to be assembled or disassembled by relative vertical movement. The downward movement of the bushing 25 is limited by a stop plate 29 in the form of an angle iron having a horizontal section 30 on which the bushing 25 seats, and a vertical section 31 which is clamped to the body 28 by a bolt 32. Said bolt extends through a vertically elongated opening 33 formed in the body 28 and thereby permits vertical adjustment of the stop plate so that the position of the bushing 25 can be accurately adjusted in a vertical direction. The parts 25 and 28 are shaped to provide an air space 34 which serves to insulate the bushing, said space functioning as above described in regard to the air space 23 (Fig. 2).

Figs. 5 and 6 illustrate a further modification in which the present invention is adapted to a double mold. As here shown, a mold body 35 is designed to support a plurality of inserts or bushings 25, each formed with a mold cavity. The bushings are in this instance secured in position by clamping bolts 36 screw threaded in the body 35 and having tapered ends to engage correspondingly tapered openings in the bushings.

Figs. 7 and 8 illustrate another modification in which the insert or bushing 25 is provided with a series of vertical ribs 40 formed on the rear wall of the bushing and located within the air space 34. These ribs greatly increase the surface area of the bushing 25 and thus permit a comparatively rapid transfer of heat from the bushing to the air space 34. These ribs are adapted for use in forming a blank of comparatively large diameter or of a size or shape which makes desirable a comparatively rapid extraction of the heat therefrom.

If desired, provision may be made for circulating cooling air through the air chamber or space between the mold body and bushing, thereby causing a more rapid extraction of heat. In this manner a comparatively rapid cooling of the parison may be effected which is sometimes desirable in the manufacture of comparatively heavy ware. At the same time overheating of the mold is prevented.

Modifications of the several constructions shown may be resorted to within the spirit and scope of our invention.

We claim:

1. A mold structure comprising the combination of a metal body, a metal lining or bushing formed with a mold cavity therein, and means for removably securing the bushing within said body, said parts being formed to provide an air space between the body and bushing, the walls of said bushing being tapered and of less thickness at one end thereof than the other.

2. A mold structure comprising a mold body section having a flat front face formed with a semi-annular recess therein, and a removable lining or bushing seated in said recess and having a flat front face flush with the face of said body, said bushing having a mold cavity therein extending lengthwise of the bushing, the wall of said recess and the opposing wall of said bushing being downwardly and outwardly tapered whereby the wall of the bushing is of less thickness adjacent the upper end thereof than at the lower end thereof.

3. A suction gathering mold comprising a vertical bushing formed with a mold cavity extending lengthwise thereof, a mold body recessed to receive said bushing, and means for removably securing the bushing within the body, the opposing walls of said bushing and mold body being downwardly and outwardly tapered and spaced apart to provide an insulating air space extending over a greater portion of the area of said opposing walls.

4. A mold structure comprising, in combination, a recessed mold body, and a bushing removably mounted in said recess, said body and bushing formed to provide a space therebetween, said bushing formed with ribs extending along its face within said space, said ribs being of less depth than the width of said space so that they are spaced from the said mold body, said bushing being formed in its outer face with a mold cavity extending lengthwise thereof.

5. The method which comprises projecting glass outwardly from a supply body of molten glass and molding it to form a parison while still integrally connected with the supply body, causing heat to be extracted from the glass during said projecting movement so that the portion of the parison more remote from the supply body is reduced to a lower temperature than the portion nearer the supply body, and then extracting heat more rapidly from said portion of the molded parison nearer the supply body than that farther from the supply body for causing an equalization of the temperature throughout the length of the parison.

6. The method which comprises projecting molten glass outwardly from a supply body into a mold cavity extending outwardly from the supply body and thereby molding a parison while the glass is still integrally united with the supply body, extracting heat from the glass in the mold cavity during its passage along said cavity, whereby the temperature of the glass remote from the supply body is lower than that adjacent the supply body, and applying to the lateral surfaces of the parison a heat conducting medium of comparatively low temperature at the hotter portion of the parison and a higher temperature at the cooler portion of the parison and thereby extracting heat from the hotter portion of the parison more rapidly than from the cooler portion whereby to equalize the temperature of the parison throughout its length.

7. The method which comprises molding a parison of molten or plastic glass and causing it to have a higher surface temperature at one end thereof than at the other, and applying to the surface of the parison a heat conducting medium having a lower temperature where applied to the hotter surface portion of the parison than where applied to the cooler surface portion, whereby the hotter portion of the parison is cooled more rapidly and the entire surface of the parison brought to a more nearly uniform temperature.

8. The method which comprises forming an elongated parison of molten or plastic glass having a higher surface temperature adjacent to one end than adjacent to the other, and applying to the lateral surfaces of the parison a heat conducting material having a comparatively low temperature where it contacts with the hotter portion of the parison surface and a higher temperature where it contacts with the cooler portion of said surface.

9. A mold half having a flat meeting face to engage a corresponding face of a complemental mold half, said meeting face being recessed to provide a mold cavity extending lengthwise of the mold, said meeting face also formed with channels spaced from and extending lengthwise of the mold cavity, the mold half being formed to provide a chamber separate from said channels and open to the said meeting face between said channels and the outer side walls of the mold.

10. A mold half having a flat face, said face being recessed to provide a mold cavity extending lengthwise of the mold, said face also formed with channels spaced from and extending lengthwise of the mold cavity, said mold half being formed to provide a chamber open at said face on opposite sides of the mold cavity between said channels and the outer edges of the mold.

11. A mold half having a flat face, said mold half comprising a recessed body and a bushing removably mounted in said recess, said bushing being shaped to provide a mold cavity in said face extending lengthwise of the mold, said mold body and bushing being shaped to provide a semi-annular space therebetween forming a chamber open at said face of the mold on opposite sides of the mold cavity, said bushing formed with vacuum channels in the face thereof on opposite sides of the mold cavity and spaced apart from the mold cavity and said chamber.

Signed at Alton, in the county of Madison and State of Illinois, this 23 day of January, 1931.

HAROLD A. ROHRICH.
LEONARD D. SOUBIER.